United States Patent
Lai et al.

(10) Patent No.: US 9,261,670 B2
(45) Date of Patent: Feb. 16, 2016

(54) FIXED-FOCUS LENS

(71) Applicants: Sheng-Tang Lai, Hsinchu (TW); Kuo-Chuan Wang, Hsinchu (TW)

(72) Inventors: Sheng-Tang Lai, Hsinchu (TW); Kuo-Chuan Wang, Hsinchu (TW)

(73) Assignee: Young Optics Inc., Hsinchu (TW)

( * ) Notice: Subject to any disclaimer, the term of this patent is extended or adjusted under 35 U.S.C. 154(b) by 0 days.

(21) Appl. No.: 14/133,642

(22) Filed: Dec. 19, 2013

(65) Prior Publication Data
US 2015/0062720 A1 Mar. 5, 2015

(30) Foreign Application Priority Data
Aug. 28, 2013 (TW) .............................. 102130850 A

(51) Int. Cl.
*G02B 9/10* (2006.01)
*G02B 9/62* (2006.01)
*G02B 3/02* (2006.01)
*G02B 13/04* (2006.01)
*G02B 13/18* (2006.01)

(52) U.S. Cl.
CPC .. *G02B 9/10* (2013.01); *G02B 3/02* (2013.01); *G02B 9/62* (2013.01); *G02B 13/04* (2013.01); *G02B 13/18* (2013.01)

(58) Field of Classification Search
CPC .............. G02B 9/04; G02B 9/10; G02B 9/12; G02B 9/34; G02B 9/58; G02B 9/60; G02B 9/62; G02B 6/64; G02B 3/02; G02B 3/04
USPC ......... 359/708, 713–717, 754–756, 761–763, 359/770, 771, 781, 784, 793
See application file for complete search history.

(56) References Cited

U.S. PATENT DOCUMENTS

| | | | |
|---|---|---|---|
| 7,023,628 B1 | 4/2006 | Ning | |
| 7,283,312 B2 | 10/2007 | Kawada | |
| 7,301,578 B2 | 11/2007 | Ohzawa et al. | |
| 7,768,719 B2 | 8/2010 | Ung et al. | |
| 7,869,141 B2 | 1/2011 | Ning | |
| 2009/0073577 A1* | 3/2009 | Jung et al. | 359/717 |
| 2009/0296234 A1* | 12/2009 | Asami | 359/713 |
| 2012/0113532 A1 | 5/2012 | Lee | |
| 2013/0050846 A1* | 2/2013 | Huang | 359/713 |

(Continued)

FOREIGN PATENT DOCUMENTS

| | | |
|---|---|---|
| JP | 2006349920 | 12/2006 |
| JP | 2007139985 | 6/2007 |

(Continued)

OTHER PUBLICATIONS

"Office Action of Taiwan Counterpart Application", issued on Dec. 2, 2014, p. 1-p. 6.

(Continued)

*Primary Examiner* — Darryl J Collins
(74) *Attorney, Agent, or Firm* — Jianq Chyun IP Office

(57) ABSTRACT

A fixed-focus lens including a first lens group and a second lens group is provided. The first lens group having a negative refractive power includes a first lens, a second lens and a third lens arranged in sequence from an object side to an image side, in which refractive powers of the first, second and third lenses are negative, negative and positive in sequence. The second lens group having a positive refractive power is located between the first lens group and the image side, and the second lens group includes a fourth lens, a fifth lens and a sixth lens arranged in sequence from the object side to the image side, in which refractive powers of the fourth, fifth and sixth lenses are positive, negative and positive in sequence. The first, second, third, fourth, fifth and sixth lenses are separated from each other.

20 Claims, 8 Drawing Sheets

(56) References Cited

U.S. PATENT DOCUMENTS

2013/0063829 A1* 3/2013 Kang .................. G02B 13/04
                                                    359/753
2013/0114150 A1* 5/2013 Kwon ................ G02B 13/0045
                                                    359/713

FOREIGN PATENT DOCUMENTS

| | | |
|---|---|---|
| JP | 2008134494 | 6/2008 |
| JP | 2010009028 | 1/2010 |
| JP | 2010160479 | 7/2010 |
| JP | 2013073151 | 4/2013 |
| JP | 2013073168 | 4/2013 |
| TW | 201100856 | 1/2011 |

OTHER PUBLICATIONS

"Office Action of Taiwan Counterpart Application," issued on Aug. 14, 2015, p1-p6.

* cited by examiner

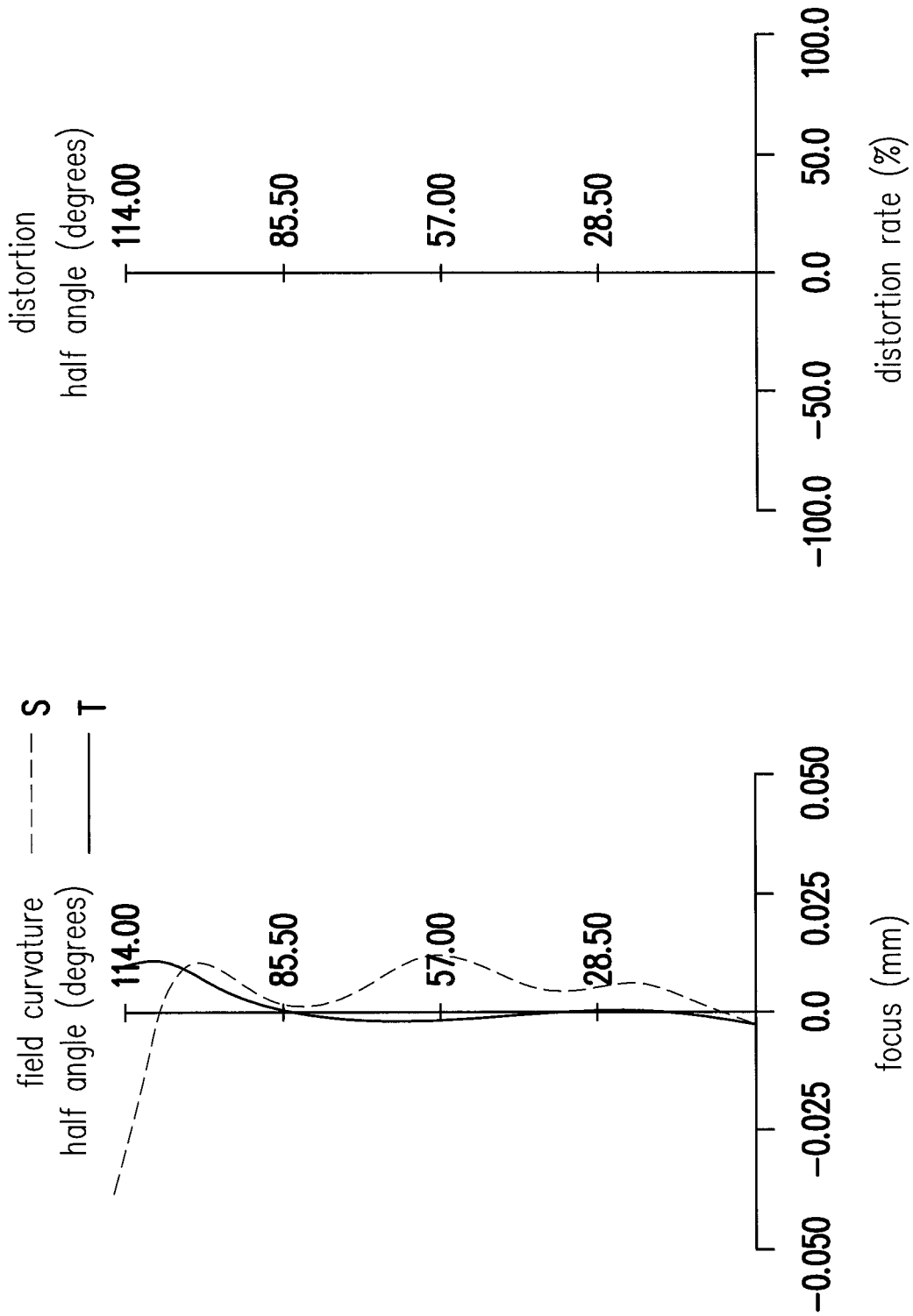

FIXED-FOCUS LENS

CROSS-REFERENCE TO RELATED APPLICATION

This application claims the priority benefit of Taiwan application serial no. 102130850, filed on Aug. 28, 2013. The entirety of the above-mentioned patent application is hereby incorporated by reference herein and made a part of this specification.

BACKGROUND OF THE INVENTION

1. Field of the Invention

The invention generally relates to a lens, and more particularly to a fixed-focus lens.

2. Description of Related Art

With advances in optical-electronic technologies, an image apparatus such as digital video camera (DVC) and digital camera (DC) has been widely applied in daily life. Lens is one of main elements in the image apparatus, and configured to render images clearly on a screen or a charge coupled device (CCD). In case the image apparatus are applied in specific fields, a wide angle lens is adopted to increase a field of view (FOV). For instance, the wide angle lens is needed and adopted in a car back-up camera, a driving assistance camera, or a security surveillance camera. Generally, cameras for cars or the security surveillance camera are used in outdoor operations, thus, besides using of the wide angle lens, a certain degree of temperature tolerance is also required.

In U.S. Pat. Nos. 7,301,578, 7,869,141, 7,283,312, 7,023,628, US patent application No. 20120113532 and Japanese Patent No. 2007139985, different wide-angle lenses are respectively disclosed, and most of the wide-angle lenses utilize at least one set of cemented lens. Although the cemented lens is conducive in reducing an aberration and a chromatic aberration of the wide-angle lens, a cost thereof is relatively higher. Also, when operating in a high temperature environment, the cemented lens is not conducive in the outdoor operations due to risks in glue failure. Based on above, how to design a lens capable of maintaining in low manufacturing cost while providing high temperature tolerance is one of research focuses for the person skied in the art.

SUMMARY OF THE INVENTION

The invention is directed to a fixed-focus lens having low manufacturing cost and high temperature tolerance.

Other objects and advantages of the invention can be further illustrated by the technical features broadly embodied and described as follows.

In order to achieve one or a part of or all of the above advantages or other advantages, an embodiment of the invention provides a fixed-focus lens, which includes a first lens group and a second lens group. The first lens group has a negative refractive power. The first lens group includes a first lens, a second lens and a third lens arranged in sequence from an object side to an image side, in which refractive powers of the first lens, the second lens and the third lenses are negative, negative and positive in sequence. The second lens group disposed between the first lens group and the image side has a positive refractive power. The second lens group includes a fourth lens, a fifth lens and a sixth lens arranged in sequence from the object side to the image side, in which refractive powers of the fourth lens, the fifth lens and the sixth lens are positive, negative, and positive in sequence. The first lens, the second lens, the third lens, the fourth lens, the fifth lens and the sixth lens are separated from each other.

Based on above, in embodiments of the invention, the cemented lens in the fixed-focus lens is replaced by multiple lenses separated from each other. Therefore, apart from effectively reducing the manufacturing cost, risks in glue failure of the cemented lens could also be avoided, so as to allow the fixed-focus lens in providing the high temperature tolerance. Moreover, the invention could also provide characteristics including wide-angle, low f-number, con-focal effect of visible light/infrared light, small in volume and low in costs.

To make the above features and advantages of the disclosure more comprehensible, several embodiments accompanied with drawings are described in detail as follows.

BRIEF DESCRIPTION OF THE DRAWINGS

FIG. 9 and FIG. 10 are respectively an astigmatism field curve and a distortion chart according to second embodiment of the invention.

DESCRIPTION OF THE EMBODIMENTS

It is to be understood that both of the foregoing and other detailed descriptions, features, and advantages are intended to be described more comprehensively by providing embodiments accompanied with figures hereinafter. In the following embodiments, wordings used to indicate directions, such as "up," "down," "front," "back," "left," and "right", merely refer to directions in the accompanying drawings. Therefore, the directional wording is used to illustrate rather than limit the invention.

First Embodiment

Figure 1:
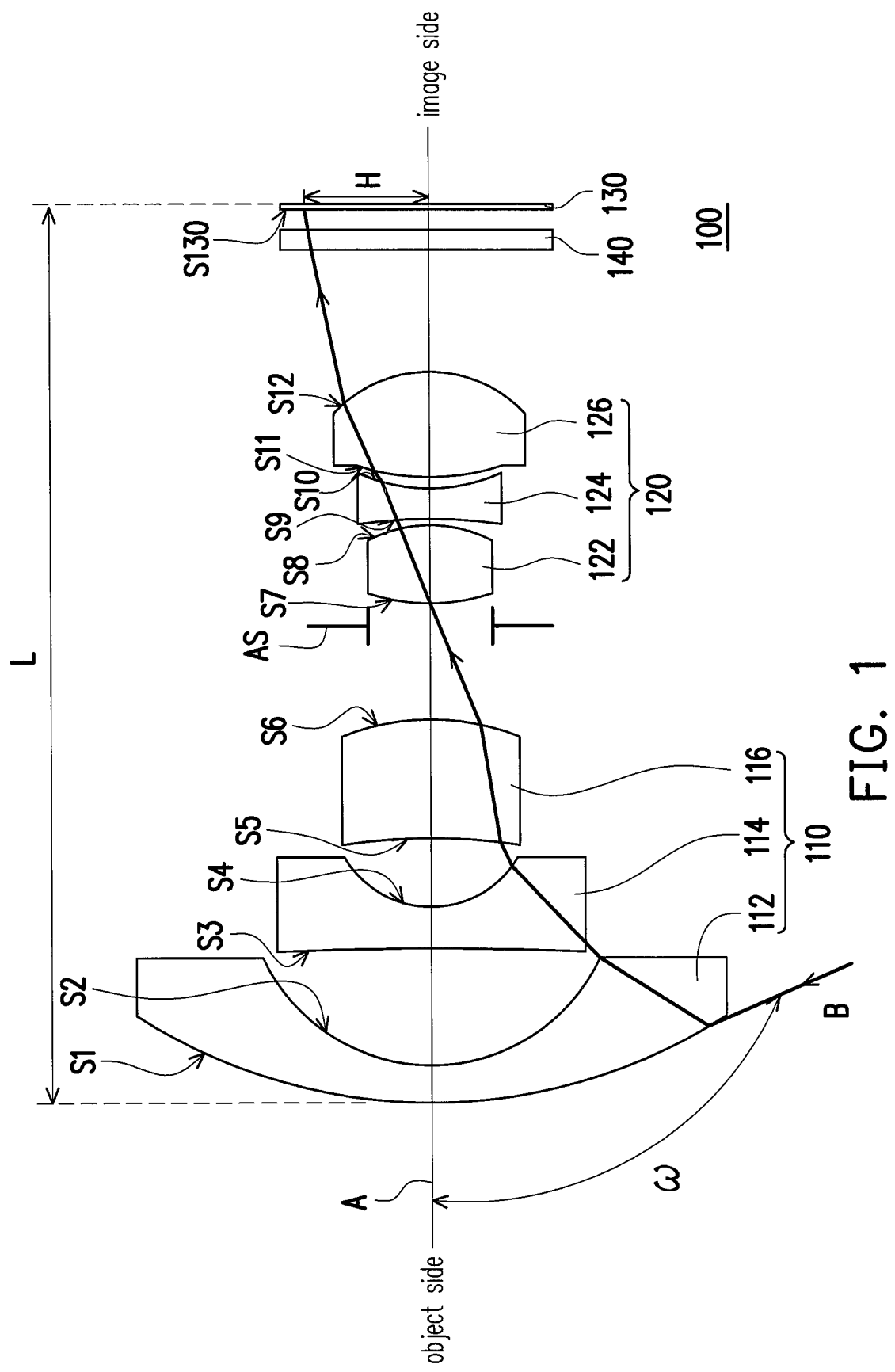
FIG. 1 is a schematic diagram of a fixed-focus lens according to first embodiment of the invention.

FIG. 1 is a schematic diagram of a fixed-focus lens according to first embodiment of the invention. Referring to FIG. 1, a fixed-focus lens 100 of the embodiment includes a first lens group 110 and a second lens group 120, in which the first lens group 110 and the second lens group 120 are arranged along an optical axis A of the fixed-focus lens 100 and located between an object side and an image side.

The first lens group 110 includes a first lens 112, a second lens 114 and a third lens 116 arranged in sequence from the object side to the image side, and refractive powers of the first lens 112, the second lens 114 and the third lens 116 are negative, negative, and positive in sequence, such that the first lens group 110 is provided with a negative refractive power. Accordingly, besides that a light beam B with a field of view ($2\omega$, in which $\omega$ is a half angle of the field of view) greater than 180 degrees or even exceeding 210 degrees could be received, the first lens group 110 could also facilitate the light beam B deviating from the optical axis A (i.e., the light beam B with the half angle $\omega$ being greater) in entering the second lens group 120 with a relatively flat angle. As a result, purpose of wide-angle could be accomplished and imaging quality of the fixed-focus lens 100 could be improved. More specifically, the first lens 112 of the embodiment is a convex-concave lens with a convex surface facing the object side (a negative meniscus lens), the second lens 114 is a plane-concave lens with a concave surface facing the image side (a plano-concave lens), and the third lens 116 is a concave-convex lens with a concave surface facing the object side (a positive meniscus lens). In case the optical axis is defined as a center axis, a convex lens is a lens having a thickness at a center of the lens thicker than a thickness at an edge of the lens; and a concave lens is a lens having a thickness at a center thinner than a thickness at an edge of the lens.

The second lens group 120 is disposed between the first lens group 110 and the image side, and the second lens group 120 includes a fourth lens 122, a fifth lens 124 and a sixth lens 126 arranged in sequence from the object side to the image side. The refractive powers of the fourth lens 122, the fifth lens 124 and the sixth lens 126 are positive, negative, positive in sequence, such that the second lens group 120 is provided with a positive refractive power. Accordingly, it is adapted to adjust an aberration to improve imaging quality. More specifically, the fourth lens 122 and the sixth lens 126 are double convex lens and the fifth lens 124 is a biconcave lens.

The fourth lens 122 of the second lens group 120 is configured to receive the light beam B from the first lens group 110. Therefore, it is more preferable that the fourth lens 122 adopts a material of glass with low dispersion, such as a spherical lens with an Abbe number greater than 70, so as to enhance a con-focal effect of visible light/infrared light. Accordingly, an image sensing device which adopts the fixed-focus lens 100 could detect a clear image with a preferable focus in terms of detecting image beam of the visible light during the day or detecting image beam of infrared light at night.

In addition, the embodiment could balance a thermal drift and a spherical aberration by modulating a focus f5 of the fifth lens 124 and a focus f6 of the sixth lens 126. More specifically, in case |f5/F+f6/F|<0.01 (F is an effective focal length of the fixed-focus lens 100), although the thermal drift of the fixed-focus lens 100 is significantly improved, the spherical aberration thereof is relatively greater; and in case |f5/F+f6/F|>0.2, although the spherical aberration is significantly improved, the effect for suppressing the thermal drift is relatively poor. Accordingly, by having the fixed-focus lens 100 satisfying 0.01<|f5/F+f6/F|<0.2 in the embodiment, the thermal drift and the spherical aberration could both be improved.

Further, in the embodiment, by modulating a ratio of a distance L from a surface S1 of the first lens 112 facing the object side to the image side and a maximum imaging height H of the fixed-focus lens 100, the aberration could also be controlled while maintaining the fixed-focus lens 100 in small volume. More specifically, in case L/H<6, the fixed-focus lens 100 has a length being relatively shorter and a volume being relatively smaller. However, the aberration cannot be easily controlled. In case L/H>8, the fixed-focus lens 100 has the length being relatively longer, but it is easier to control the aberration. Accordingly, by having the fixed-focus lens 100 satisfying 6<L/H<8 in the embodiment, the aberration and the volume of the fixed-focus lens 100 could be effectively controlled.

In the embodiment, the first lens 112, the second lens 114, the third lens 116, the fourth lens 122, the fifth lens 124 and the sixth lens 126 could be spheric lenses or aspheric lenses. For instance, the first lens 112, the second lens 114, and the third lens 116 include, for example, more than one aspheric lens; the fourth lens 122, the fifth lens 124 and the sixth lens 126 include, for example, more than two aspheric lenses; and the rest of said lenses could be, for example, the spheric lenses.

In addition, a material of the first lens 112, the second lens 114, the third lens 116, the fourth lens 122, the fifth lens 124 and the sixth lens 126 could be plastic or glass. In the embodiment, a material of at least one among the first lens 112, the second lens 114 and the third lens 116 is plastic and a material of the rest is glass; and a material of at least one among the fourth lens 122, the fifth lens 124 and the sixth lens 126 is plastic and a material of the rest is glass.

Furthermore, the first lens 112, the second lens 114, the third lens 116, the fourth lens 122, the fifth lens 124 and the sixth lens 126 are separated from each other. In other words, in the embodiment, none of the first lens 112, the second lens 114, the third lens 116, the fourth lens 122, the fifth lens 124 and the sixth lens 126 is a cemented lens, and a double cemented lens is not formed by any two of above. Namely, it is defined that a gap is provided between any two adjacent lens in the fixed-focus lens 100, in which the gap is smaller than 3.0 mm. Accordingly, the fixed-focus lens 100 could have the length being shorter and the volume being smaller, so as to meet configurations in use.

Since the fixed-focus lens 100 is merely provided with six lenses (i.e., the first lens 112, the second lens 114, the third lens 116, the fourth lens 122, the fifth lens 124 and the sixth lens 126), the fixed-focus lens 100 could have the length being shorter and the volume being smaller, so as to meet the requirements as being slimness for car cameras, and to be placed in a bumper or other position of the car. In addition, since the fixed-focus lens 100 adopts the lenses including materials of both glass and plastic, and applying both spheric lenses and aspheric lenses, besides that fixed-focus lens 100 could have a relatively low manufacturing cost, problems such as coma, astigmatism or distortion in the fixed-focus lens 100 could also be effectively improved. Moreover, in the fixed-focus lens 100, the cemented lens is replaced by multiple lenses separated from each other. Therefore, the fixed-focus lens 100 of the embodiment could avoid risks in glue failure of the cemented lens, so that the fixed-focus lens could have the high temperature tolerance. That is, the fixed-focus lens 100 is suitable to operate within a relatively greater operating temperature range. In the embodiment, the fixed-focus lens 100 could operate in a temperature range of, for example, −40° C. to 85° C. Further, the field of view of the fixed-focus lens 100 could be greater than 180 degrees, so that visual field for back-up or driving the car can be wider. In other words, the fixed-focus lens 100 could serve as a wide-angle lens. In addition, an f-number value of the fixed-focus lens 100 could be as small as close to 2.0 to increase quantity of light entered, so as facilitate in use under dark environment.

Generally, a photosensitive element 130 and a protective cover 140 could be disposed on the image side, in which the photosensitive element 130 is adapted to sense the light beam B from the object side, and a surface S130 of the photosensitive element 130 facing the object side is an imaging surface. The protective cover 140 is disposed on a side of the imaging surface of the photosensitive element 130 to protect the photosensitive element 130. In the embodiment, the photosensitive element 130 is, for example, a charge coupled device (CCD) or a complementary metal oxide semiconductor (CMOS) sensor. However, in other embodiments, the photosensitive element 130 could also be a film or other appropriate photosensitive elements. In addition, the fixed-focus lens 100 could further include an aperture stop AS which is disposed between the first lens group 110 and the second lens group 120, namely, disposed between the third lens 116 and the fourth lens 122.

Preferable parameter values of the fixed-focus lens 100 are listed below. However, the invention is not limited to the data listed below. It should be known to those ordinary skilled in the art that various modifications and variations can be made to the structure of the invention without departing from the scope or spirit of the invention.

TABLE 1

| Lenses | Surface | Curvature radius (mm) | Distance (mm) | Dispersion Value |
|---|---|---|---|---|
| First Lens | S1 | 12.51 | 0.75 | |
| | S2 | 3.97 | 2.40 | |
| Second Lens | S3 | 162.97 | 0.85 | |
| | S4 | 2.10 | 1.49 | |

TABLE 1-continued

| Lenses | Surface | Curvature radius (mm) | Distance (mm) | Dispersion Value |
|---|---|---|---|---|
| Third Lens | S5 | −12.19 | 2.45 | |
| | S6 | −5.40 | 1.68 | |
| Aperture Stop | | Infinity | 0.18 | |
| Fourth Lens | S7 | 5.12 | 1.64 | 81.6 |
| | S8 | −3.50 | 0.10 | |
| Fifth Lens | S9 | 32.29 | 0.63 | |
| | S10 | 2.18 | 0.22 | |
| Sixth Lens | S11 | 3.22 | 2.21 | |
| | S12 | −3.28 | 3.29 | |

In Table 1, "Radius of Curvature" refers to a radius of curvature of each surface. "Distance" refers to a straight line distance between two adjacent surfaces on the optical axis A. For instance, the distance of the surface S1 refers to the straight line distance from the surface S1 to the surface S2 on the optical axis A. Additionally, in Table 1, the surfaces S1 and S2 are two opposite surfaces of the first lens 112. The surfaces S3 and S4 are two opposite surfaces of the second lens 114. The surfaces S5 and S6 are two opposite surfaces of the third lens 116. The surfaces S7 and S8 are two opposite surfaces of the fourth lens 122. The surfaces S9 and S10 are two opposite surfaces of the fifth lens 124. The surfaces S11 and S12 are two opposite surfaces of the sixth lens 126. The distance listed in the row of the surface S12 is the distance from the surface S12 to a surface of the photosensitive element 130 which is far away from the object side. The radius of curvature, the distance, and other parameters are shown in Table 1, so they are not further described herein.

In the embodiment, the fixed-focus lens 100 includes the effective focal length F being 1.57 mm, the f-number value being 2.0, the field of view (which is twice the half angle ω in FIG. 1) being 228 degrees, and the fixed-focus lens 100 also includes the length L being 17.9 mm, the maximum imaging height H being 2.61 mm, |f5/F+f6/F|=0.14 and L/H=6.85.

Moreover, in the embodiment, the first lens 112, the third lens 116 and the fourth lens 122 are the spheric lens made of glass, and the second lens 114, the fifth lens 124 and the sixth lens 126 are the aspheric lens made of plastic, in which the aspheric lens can be represented by the following equation:

$$Z = \frac{cr^2}{1+\sqrt{1-(1+k)c^2r^2}} + A_2 r^2 + A_4 r^4 + A_6 r^6 + A_8 r^8 + A_{10} r^{10} + A_{12} r^{12} + A_{14} r^{14}$$

In above equation, Z is a sag on a direction of the optical axis A; c is an inverse of the radius of curvature proximate to the optical axis A; k is conic constant; r is an aspheric height (i.e., a distance from any point on the lens to the optical axis A); and $A_4, A_6, A_8, A_{10}, A_{12}$ and $A_{14}$ are aspheric coefficients, and the aspheric coefficient $A_2$ in the embodiment is 0. Aspheric parameter values of the surfaces S3, S4, S9, S10, S11 and S12 are listed in Table 2 below.

TABLE 2

| Surface | K | $A_4$ | $A_6$ | $A_8$ | $A_{10}$ | $A_{12}$ | $A_{14}$ |
|---|---|---|---|---|---|---|---|
| S3 | 0 | 2.483E−03 | −6.863E−04 | 5.426E−05 | −6.236E−07 | −1.307E−07 | 5.175E−09 |
| S4 | −0.256 | 9.149E−03 | 2.601E−03 | −1.122E−03 | 9.499E−05 | 3.992E−05 | −7.527E−06 |
| S9 | 0 | −3.183E−02 | 6.201E−03 | −1.881E−03 | 1.202E−04 | 9.489E−10 | −1.638E−12 |
| S10 | 0 | −3.183E−02 | 1.403E−02 | −3.571E−03 | 2.507E−04 | −1.158E−10 | −2.121E−12 |
| S11 | −0.127 | −3.315E−02 | 5.128E−03 | −7.226E−04 | 3.147E−05 | 3.277E−10 | 6.541E−13 |
| S12 | 0.008 | −3.633E−03 | −2.762E−04 | 7.054E−05 | −2.856E−05 | 2.929E−06 | −1.353E−12 |

Figure 2:
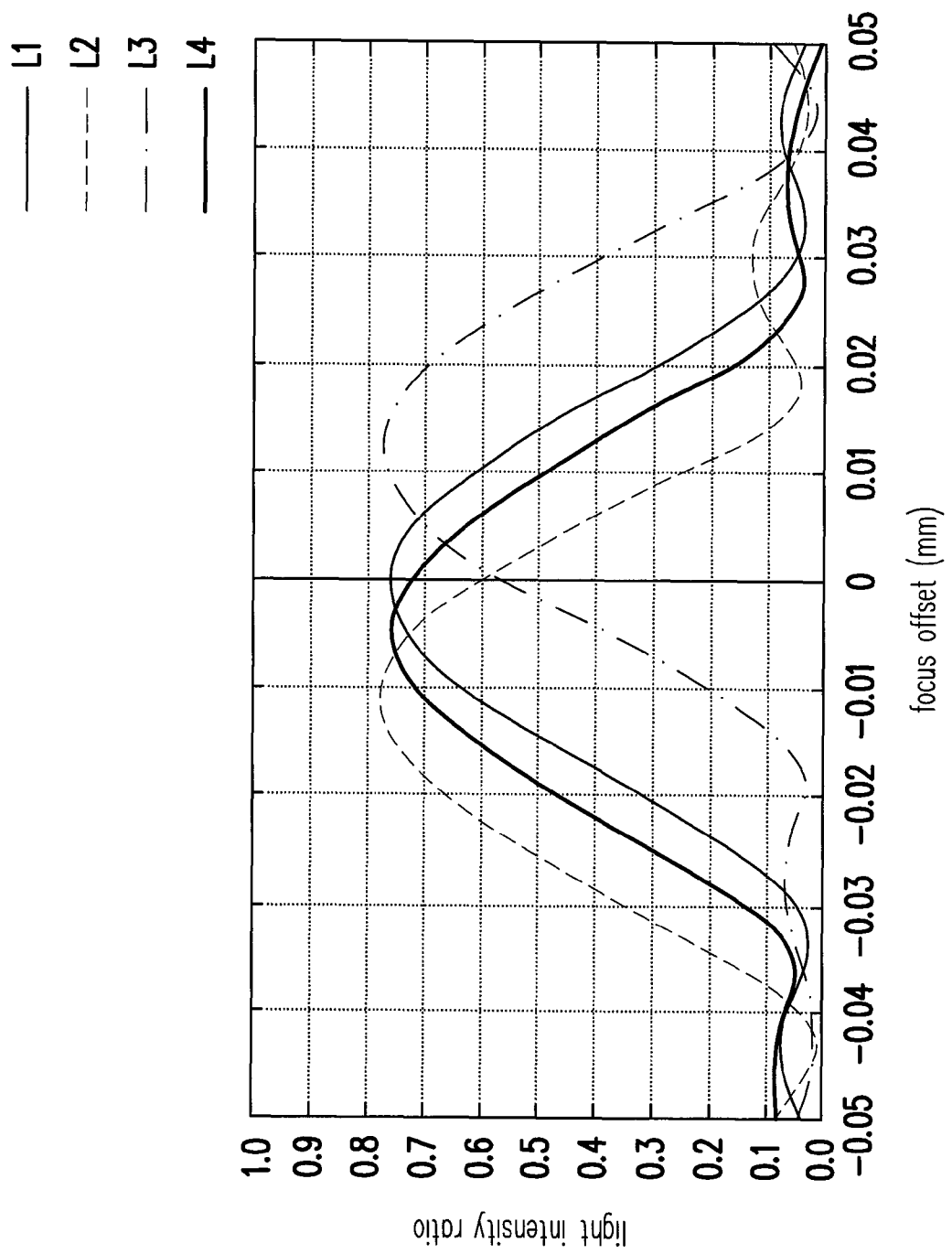
FIG. 2 is an optical modulation transfer function curve diagram according to first embodiment of the invention.
Figure 3A:
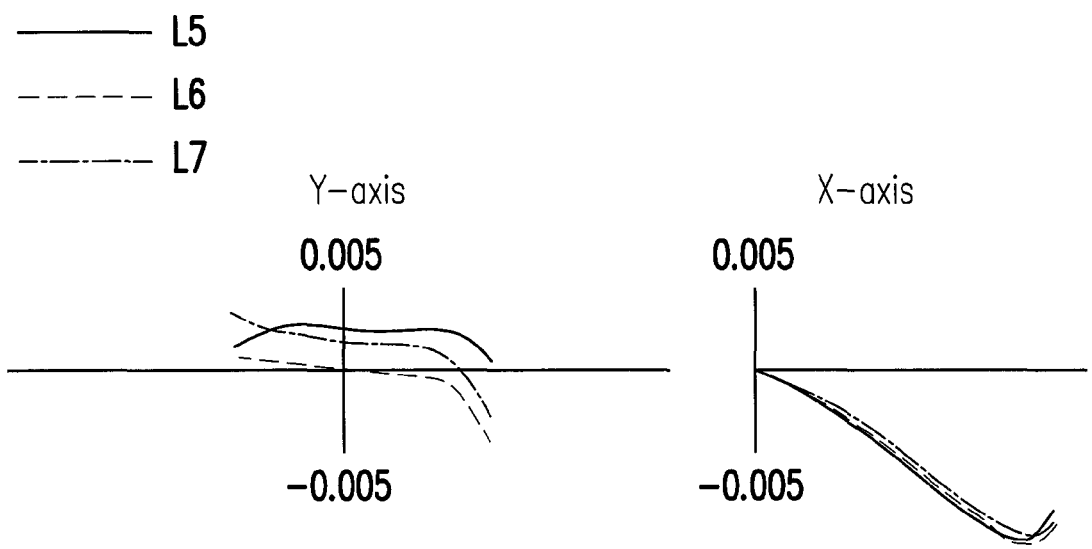
FIG. 3A through FIG. 3C are transverse ray fan plots according to first embodiment of the invention.
Figure 3B:
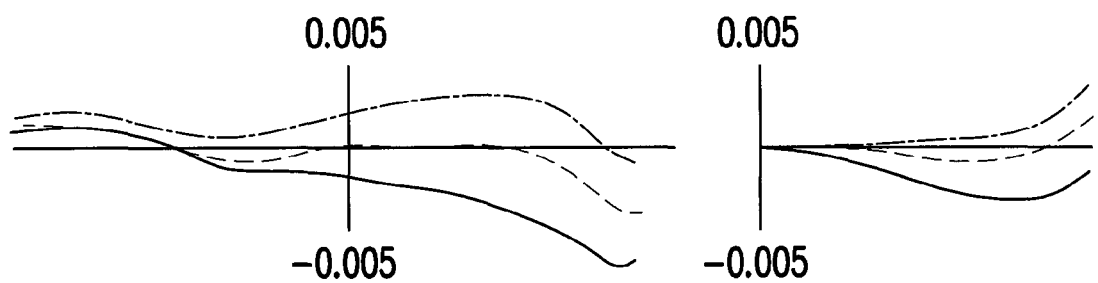
Figure 3C:
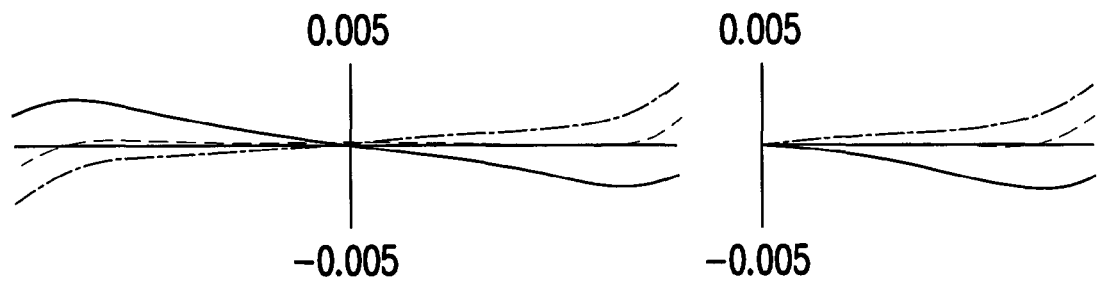
Figures 4, 5:
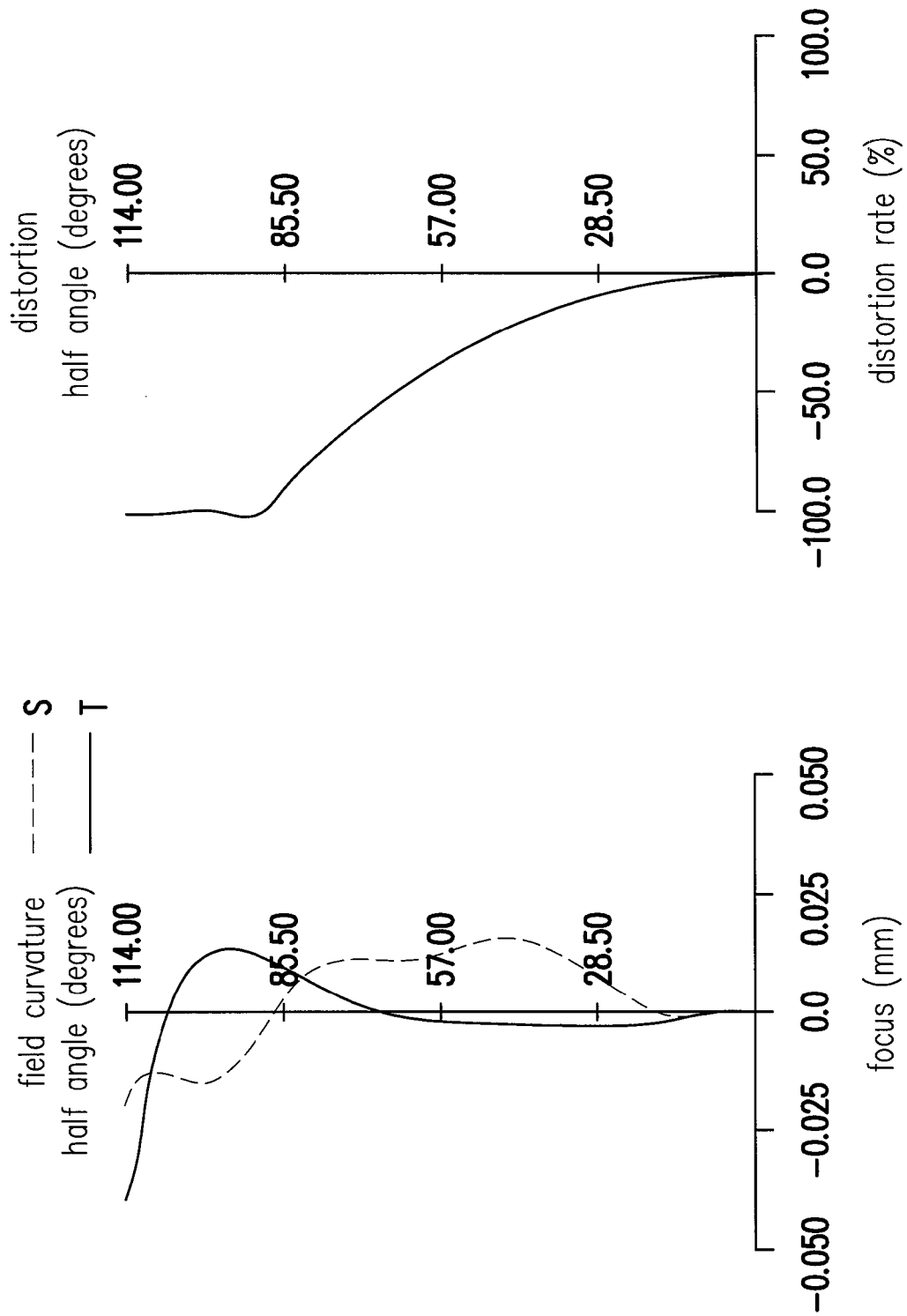
FIG. 4 and FIG. 5 are respectively an astigmatism field curve and a distortion chart according to first embodiment of the invention.

Imaging quality of the fixed-focus lens 100 is verified by the optical simulated data listed below. FIG. 2 is an optical modulation transfer function (MTF) curve diagram according to first embodiment of the invention. FIG. 3A through FIG. 3C are transverse ray fan plots according to first embodiment of the invention. FIG. 4 and FIG. 5 are respectively an astigmatism field curve and a distortion chart according to first embodiment of the invention.

FIG. 2 is used for verifying the con-focal effect of visible light/infrared light and the thermal drift in the fixed-focus lens according to first embodiment. In FIG. 2, a curve L1 is the optical modulation transfer function curve of the visible light under 25° C. A curve L2 is the optical modulation transfer function curve of the infrared light under 25° C. after a modulation with the visible light under 25° C. is made. Curves L3 and L4 are also the optical modulation transfer function curves of the visible lights respectively under −40° C. and 85° C. after the modulation with the visible light under 25° C. is made. FIG. 3A through FIG. 3C are used for verifying the spherical aberration of the fixed-focus lens according to first embodiment. In FIG. 3A through FIG. 3C, a horizontal axis represents a position of the light beam passing the aperture stop, and a vertical axis refers to a position of the light beam being transmitted to an image plane. Further, curves L5, L6, L7 are optical characteristics curves respectively under wavelengths of 486 nm, 588 nm and 656 nm, and FIG. 3A, FIG. 3B and FIG. 3C are optical characteristics curves with the half angle ω depicted in FIG. 1 respectively being 113 degrees, 60 degrees and 0 degree. Further, in FIG. 4, a curve S represents data of a sagittal direction, and a curve T represents data of a tangential direction. In view of above, all the graphics shown in FIG. 2 through FIG. 5 fall within a standard range, thus it is verified that the fixed-focus lens 100 of this embodiment could provide a favorable imaging quality.

Second Embodiment

Figure 6:
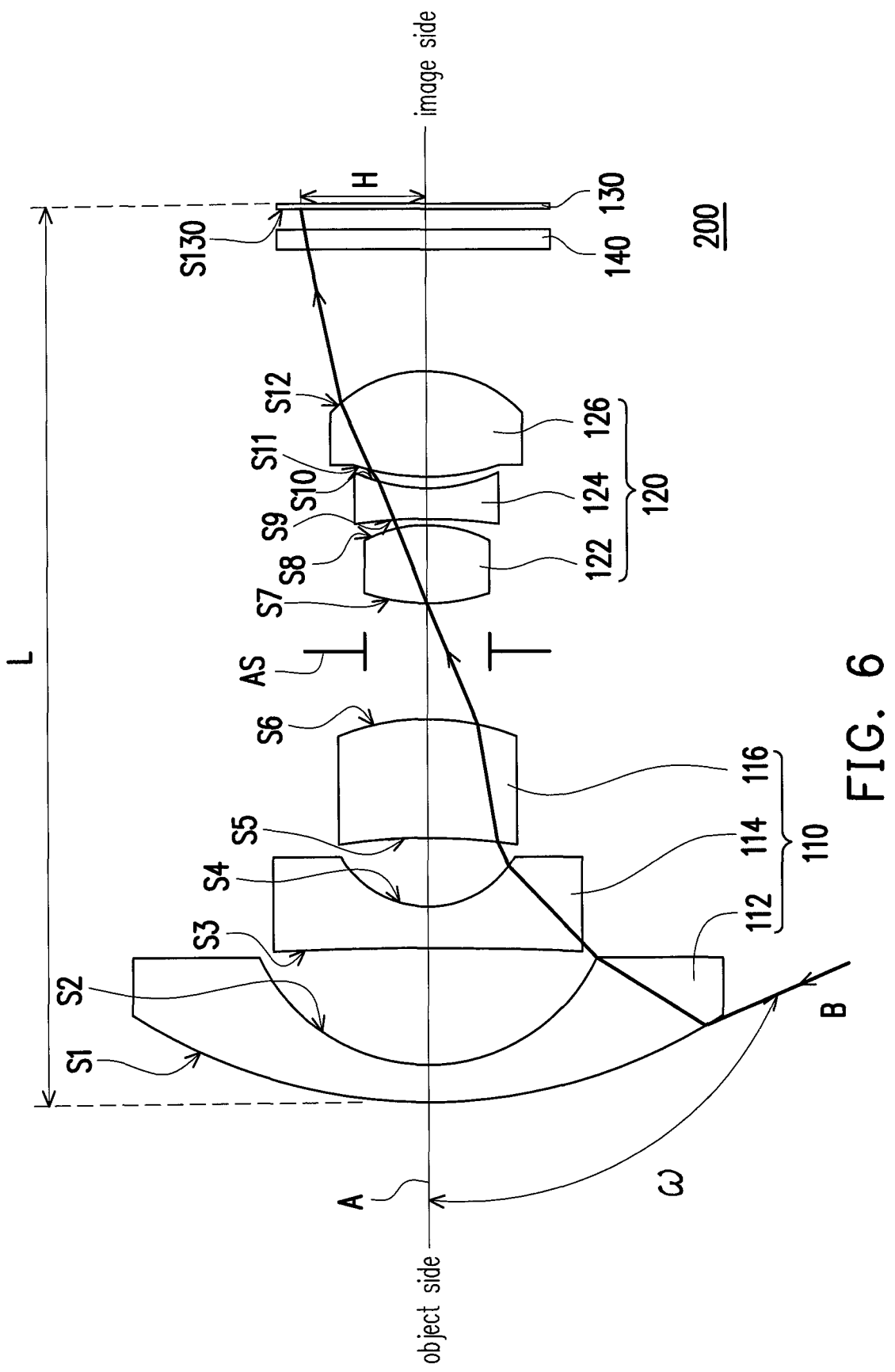
FIG. 6 is a schematic diagram of a fixed-focus lens according to second embodiment of the invention.

FIG. 6 is a schematic diagram of a fixed-focus lens according to second embodiment of the invention. Referring to FIG. 6, a fixed-focus lens 200 of the embodiment is similar to the fixed-focus lens 100 depicted in FIG. 1, and a major difference thereof is selections of curvature radius, the distance and the spheric/aspheric lenses for said lenses. Preferable parameter values of the fixed-focus lens 200 are listed in Table 3 and Table 4 below. However, the invention is not limited to the data listed below. It should be known to those ordinary skilled in the art that various modifications and variations can be made to the structure of the invention without departing from the scope or spirit of the invention.

TABLE 3

| Lenses | Surface | Curvature radius (mm) | Distance (mm) | Dispersion Value |
|---|---|---|---|---|
| First Lens | S1 | 12.44 | 0.75 | |
| | S2 | 4.64 | 2.80 | |
| Second Lens | S3 | −20.51 | 0.80 | |
| | S4 | 2.16 | 1.81 | |
| Third Lens | S5 | −6.62 | 2.00 | |
| | S6 | −3.29 | 1.29 | |
| Aperture Stop | | Infinity | 0.78 | |
| Fourth Lens | S7 | 5.70 | 1.77 | 81.6 |
| | S8 | −2.96 | 0.10 | |
| Fifth Lens | S9 | −23.11 | 0.80 | |
| | S10 | 2.43 | 0.17 | |
| Sixth Lens | S11 | 2.88 | 1.98 | |
| | S12 | −4.33 | 3.14 | |

In the embodiment, the fixed-focus lens 200 includes the effective focal length F being 1.57 mm, the f-number value being 2.0, the field of view 2ω being 226 degrees, and the fixed-focus lens 200 also includes the length L being 18.18 mm, the maximum imaging height H being 2.62 mm, |f5/F+f6/F|=0.12 and L/H=6.95.

Moreover, in the embodiment, the first lens 112 and the fourth lens 122 are, for example, the spheric lens made of glass, and the second lens 114, the third lens 116, the fifth lens 124 and the sixth lens 126 are the aspheric lens made of plastic, in which the aspheric lens can be represented by the equation as shown in the foregoing embodiment. Aspheric parameter values of the surfaces S3, S4, S5, S6, S9, S10, S11 and S12 are listed in Table 4 below.

TABLE 4

| Surface | K | $A_4$ | $A_6$ | $A_8$ | $A_{10}$ | $A_{12}$ | $A_{14}$ |
|---|---|---|---|---|---|---|---|
| S3 | 0 | 3.940E-03 | −7.871E-04 | 1.060E-04 | −7.752E-06 | 2.946E-07 | −4.537E-09 |
| S4 | 0 | 5.315E-03 | −1.026E-02 | 6.618E-03 | −3.045E-03 | 6.916E-04 | −6.413E-05 |
| S5 | 0 | −1.394E-02 | −1.681E-03 | 2.145E-04 | −1.674E-05 | 6.929E-06 | −1.064E-06 |
| S6 | 0 | −1.244E-03 | −9.638E-04 | 7.656E-04 | −1.942E-04 | 1.842E-05 | 0 |
| S9 | 0 | −2.082E-02 | 2.693E-04 | −1.470E-03 | 5.059E-04 | −5.466E-05 | 0 |
| S10 | 0 | −2.513E-02 | −5.955E-04 | −6.373E-04 | 2.841E-04 | −4.236E-05 | 0 |
| S11 | 0 | −1.559E-02 | 6.851E-05 | −2.555E-04 | 1.000E-04 | −1.169E-05 | 0 |
| S12 | 0 | −4.688E-03 | 8.400E-04 | −1.519E-04 | 3.435E-05 | −1.282E-06 | 0 |

Figure 7:
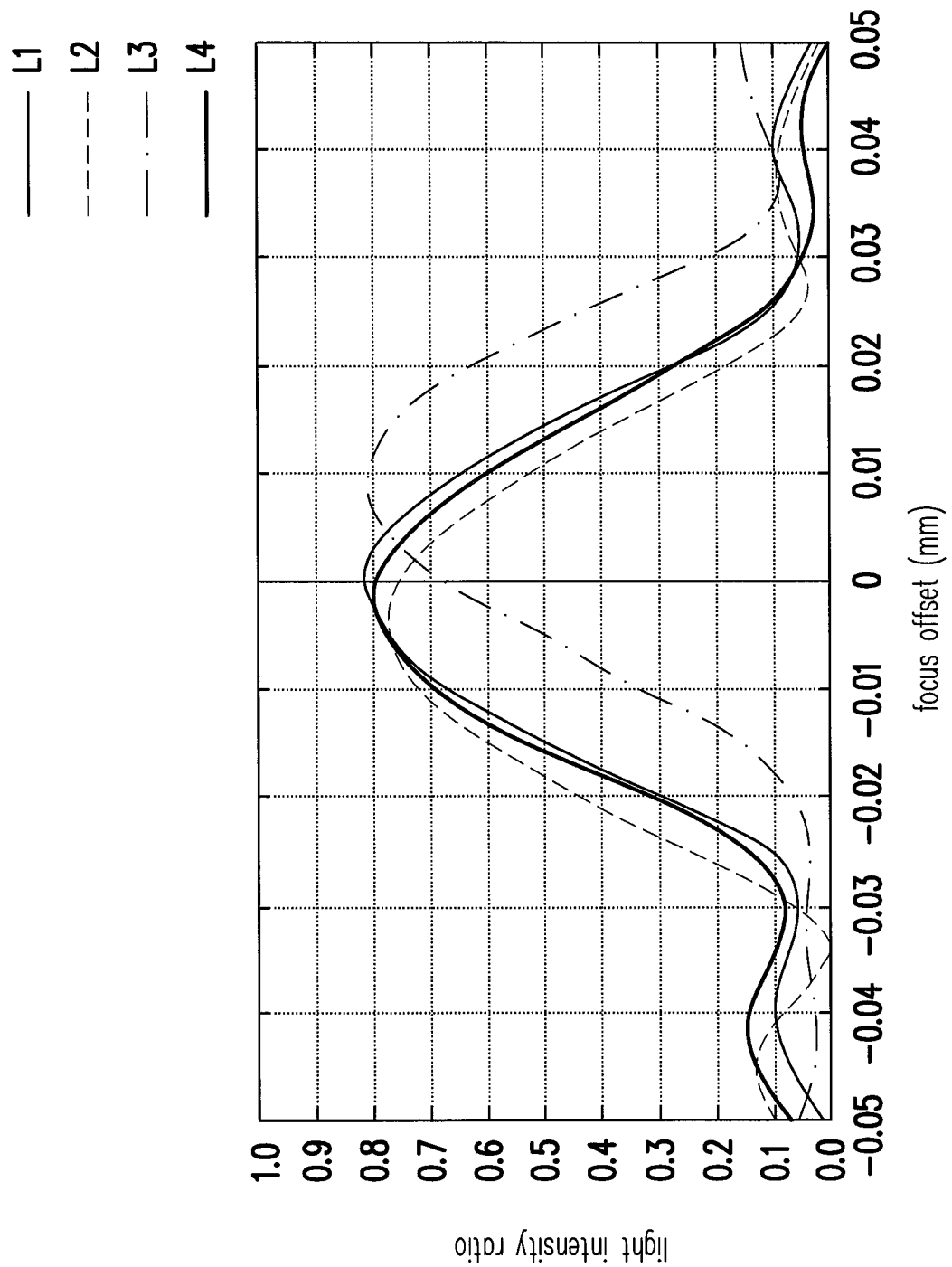
FIG. 7 is an optical modulation transfer function curve diagram according to second embodiment of the invention.
Figure 8A:
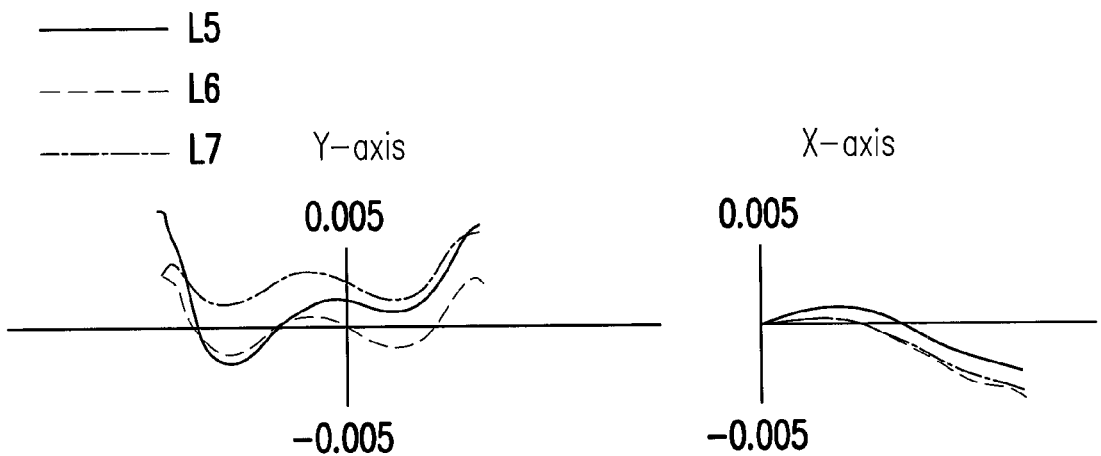
FIG. 8A through FIG. 8C are transverse ray fan plots according to second embodiment of the invention.
Figure 8B:
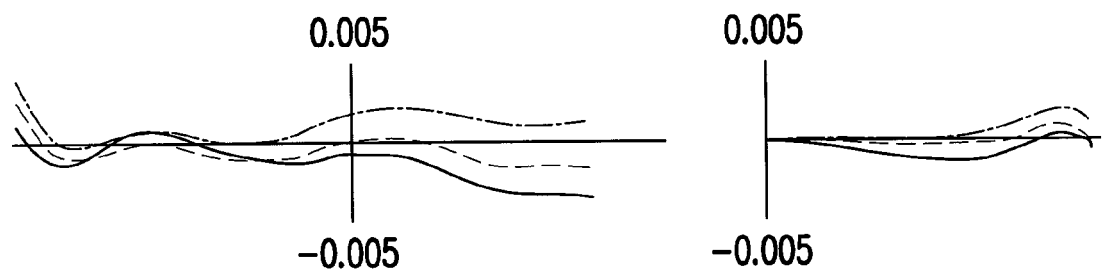
Figure 8C:
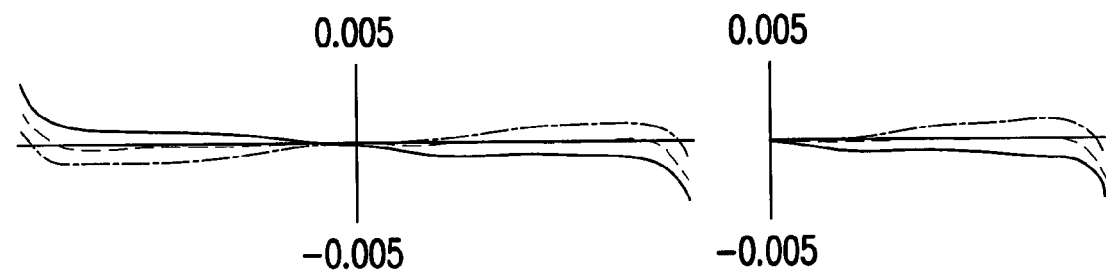

Imaging quality of the fixed-focus lens 200 is verified by the optical simulated data listed below. FIG. 7 is an optical modulation transfer function curve diagram according to second embodiment of the invention. FIG. 8A through FIG. 8C are transverse ray fan plots according to second embodiment of the invention. FIG. 9 and FIG. 10 are respectively an astigmatism field curve and a distortion chart according to second embodiment of the invention. Each curve in FIG. 7, FIG. 8A, FIG. 8B, FIG. 8C and FIG. 9 can refer to FIG. 2 through FIG. 4, thus related description is omitted hereinafter. In view of above, all the graphics shown in FIG. 7 through FIG. 10 fall within a standard range, thus it is verified that the fixed-focus lens 200 of this embodiment could provide a favorable imaging quality.

In first and second embodiments, first embodiment is illustrated with three lenses made of plastic and three lenses made of glass as an example, and second embodiment is illustrated with four lenses made of plastic and two lenses made of glass as an example, but the invention is not limited thereto. In other embodiments, the fixed-focus lens could also be composed of one lens made of plastic and five lenses made of glass, or composed of two lenses made of plastic and four lenses made of glass. Or, in case the fixed-focus lens is applied as indoor camera such as the security surveillance camera, since endurance to impacts is not the first consideration for the first lens, lens made of plastic could be selected as the first lens, which means that the fixed-focus lens could be composed of five lenses made of plastic and one lens made of glass (the fourth lens), so as to further reduce manufacturing cost for the fixed-focus lens.

In summary, in embodiments of the invention, the cemented lens of the fixed-focus lens is replaced by multiple lenses separated from each other. Therefore, apart from effectively reducing the manufacturing cost, the fixed-focus lens could also avoid risks in glue failure of the cemented lens, so as allow the fixed-focus lens in providing the high temperature tolerance.

The embodiments described hereinbefore are chosen and described in order to best explain the principles of the invention and its best mode practical application. It is not intended to be exhaustive to limit the invention to the precise form or to the exemplary embodiments disclosed. Namely, persons skilled in the art are enabled to understand the invention through various embodiments with various modifications as are suited to the particular use or implementation contemplated. It is intended that the scope of the invention be defined by the claims appended hereto and their equivalents in which all terms are meant in their broadest reasonable sense unless otherwise indicated. Any of the embodiments or any of the claims of the invention does not need to achieve all of the objects, advantages or features disclosed by the invention. Moreover, the abstract and the headings are merely used to aid in searches of patent files and are not intended to limit the scope of the claims of the invention. Moreover, the terms such as "first lens", "second lens" as recited in the specification are intended to give the elements names, and the maximum number or the minimum number of the elements are not limited thereto.

What is claimed is:

1. A fixed-focus lens, comprising:
    a first lens group having a negative refractive power, the first lens group comprising a first lens, a second lens and a third lens arranged in sequence from an object side to an image side, and refractive powers of the first lens, the second lens and the third lens being negative, negative and positive in sequence; and
    a second lens group having a positive refractive power, disposed between the first lens group and the image side, the second lens group comprising a fourth lens, a fifth lens and a sixth lens arranged in sequence from the object side to the image side, and refractive powers of the fourth lens, the fifth lens and the sixth lens being positive, negative and positive in sequence, wherein the first lens, the second lens, the third lens, the fourth lens, the fifth lens and the sixth lens are separated from each other, and an Abbe number of the fourth lens is greater than 70.

2. The fixed-focus lens as recited in claim 1, wherein none of the first lens, the second lens, the third lens, the fourth lens, the fifth lens and the sixth lens is a cemented lens, and a double cemented lens is not formed by any two of above.

3. The fixed-focus lens as recited in claim 1, wherein the fixed-focus lens satisfies $0.01<|f5/F+f6/F|<0.2$, wherein $f5$ is an effective focal length of the fifth lens, $f6$ is an effective focal length of the sixth lens and F is an effective focal length of the fixed-focus lens.

4. The fixed-focus lens as recited in claim 1, wherein a material of at least one among the first lens, the second lens and the third lens is plastic and a material of the rest is glass; and a material of at least one among the fourth lens, the fifth lens and the sixth lens is plastic and a material of the rest is glass.

5. The fixed-focus lens as recited in claim 1, wherein a material of the fourth lens is glass.

6. The fixed-focus lens as recited in claim 5, wherein an Abbe number of the fourth lens is greater than 75.

7. The fixed-focus lens as recited in claim 1, wherein the first lens, the second lens, and the third lens comprise more than one aspheric lens, and the fourth lens, the fifth lens and the sixth lens comprise more than two aspheric lenses.

8. The fixed-focus lens as recited in claim 1, wherein the fixed-focus lens satisfies $6<L/H<8$, wherein L is a distance from a surface of the first lens facing the object side to the image side on an optical axis of the fixed-focus lens, and H is a maximum imaging height of the fixed-focus lens.

9. The fixed-focus lens as recited in claim 1, further comprising an aperture stop disposed between the first lens group and the second lens group.

10. The fixed-focus lens as recited in claim 1, wherein the first lens is a convex-concave lens with a convex surface facing the object side, the second lens is a plane-concave lens with a concave surface facing the image side, the third lens is a concave-convex lens with a concave surface facing the object side, the fourth lens and the sixth lens are respectively biconvex lenses, and the fifth lens is a biconcave lens.

11. A fixed-focus lens, comprising:
a first lens group having a negative refractive power, the first lens group comprising a first lens, a second lens and a third lens arranged in sequence from an object side to an image side; and
a second lens group having a positive refractive power, disposed between the first lens group and the image side, the second lens group comprising a fourth lens, a fifth lens and a sixth lens arranged in sequence from the object side to the image side, wherein the first lens, the second lens, the third lens, the fourth lens, the fifth lens and the sixth lens are separated from each other, and among all the lenses in the second lens group, only the fourth lens has an Abbe number greater than 70.

12. The fixed-focus lens as recited in claim 11, wherein none of the first lens, the second lens, the third lens, the fourth lens, the fifth lens and the sixth lens is a cemented lens, and a double cemented lens is not formed by any two of above.

13. The fixed-focus lens as recited in claim 11, wherein the fixed-focus lens satisfies $0.01<|f5/F+f6/F|<0.2$, wherein $f5$ is an effective focal length of the fifth lens, $f6$ is an effective focal length of the sixth lens and F is an effective focal length of the fixed-focus lens.

14. The fixed-focus lens as recited in claim 11, wherein a material of at least one among the first lens, the second lens and the third lens is plastic and a material of the rest is glass; and a material of at least one among the fourth lens, the fifth lens and the sixth lens is plastic and a material of the rest is glass.

15. The fixed-focus lens as recited in claim 11, wherein a material of the fourth lens is glass.

16. The fixed-focus lens as recited in claim 15, wherein the Abbe number of the fourth lens is greater than 75.

17. The fixed-focus lens as recited in claim 11, wherein the first lens, the second lens, and the third lens comprise more than one aspheric lens, and the fourth lens, the fifth lens and the sixth lens comprise more than two aspheric lenses.

18. The fixed-focus lens as recited in claim 11, wherein the fixed-focus lens satisfies $6<L/H<8$, wherein L is a distance from a surface of the first lens facing the object side to the image side on an optical axis of the fixed-focus lens, and H is a maximum imaging height of the fixed-focus lens.

19. The fixed-focus lens as recited in claim 11, further comprising an aperture stop disposed between the first lens group and the second lens group.

20. The fixed-focus lens as recited in claim 11, wherein the first lens is a convex-concave lens with a convex surface facing the object side, the second lens is a plane-concave lens with a concave surface facing the image side, the third lens is a concave-convex lens with a concave surface facing the object side, the fourth lens and the sixth lens are respectively biconvex lenses, and the fifth lens is a biconcave lens.

* * * * *